United States Patent
Broussard et al.

(10) Patent No.: US 6,249,611 B1
(45) Date of Patent: Jun. 19, 2001

(54) METHOD AND APPARATUS FOR COMPRESSING AND EXPANDING DIGITAL DATA

(75) Inventors: Dane John Broussard; Richard Ray Matthews, both of Garland, TX (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/599,975

(22) Filed: Jun. 21, 2000

Related U.S. Application Data

(63) Continuation of application No. 08/204,965, filed on Mar. 2, 1994.

(51) Int. Cl.[7] .................................................. G06K 9/36
(52) U.S. Cl. ................................... 382/232; 382/298
(58) Field of Search .................................. 382/232, 236, 382/238, 298, 299; 375/245

(56) References Cited

U.S. PATENT DOCUMENTS

| | | | |
|---|---|---|---|
| 4,303,947 | 12/1981 | Stoffel | 358/260 |
| 4,628,534 | 12/1986 | Marshall | 382/41 |
| 4,706,260 | 11/1987 | Fedele et al. | 375/27 |
| 4,734,768 | 3/1988 | Pexa | 358/135 |
| 4,786,975 | * 11/1988 | Postl | 358/283 |
| 4,829,453 | 5/1989 | Katsuta et al. | 364/521 |
| 4,868,764 | 9/1989 | Richards | 364/518 |
| 5,048,111 | 9/1991 | Jones et al. | 382/56 |
| 5,103,306 | 4/1992 | Weiman et al. | 358/133 |
| 5,153,936 | 10/1992 | Morris et al. | 395/128 |
| 5,271,064 | 12/1993 | Dhawan et al. | 382/54 |
| 5,289,548 | 2/1994 | Wilson et al. | 382/56 |
| 5,293,432 | 3/1994 | Gonser et al. | 382/47 |
| 5,309,526 | 5/1994 | Pappas et al. | 382/56 |
| 5,341,442 | 8/1994 | Barrett | 382/56 |
| 5,448,654 | 9/1995 | Katayama et al. | 382/298 |
| 6,137,922 | * 10/2000 | Broussard et al. | 382/298 |

* cited by examiner

*Primary Examiner*—Jose L. Couso
*Assistant Examiner*—Anh Hong Do
(74) *Attorney, Agent, or Firm*—Baker Botts L.L.P.

(57) ABSTRACT

An apparatus for compressing and expanding digital data including a compressor module for compressing original data and an expander module for expanding the compressed data to substantially recover the original data. The compressor module includes a reduced resolution data set (RRDS) generator providing low pass filtering and decimation (down sampling) of the original data, and a one-dimensional delta pulse code modulation (DPCM) compressor performing either three or four bit encoding on the data output from the RRDS generator. The expander module includes a DPCM expander performing either three or four bit decoding of the data output from the compressor module, an RRDS expander providing interpolation (up-sampling) of the expanded data output from the DPCM expander, and an edge enhancement filter for processing the data output from the RRDS expander to correct for any RRDS introduced signal and texture errors. Optionally, bypass of the RRDS functionality in both the compressor and expander modules may be selected.

18 Claims, 4 Drawing Sheets

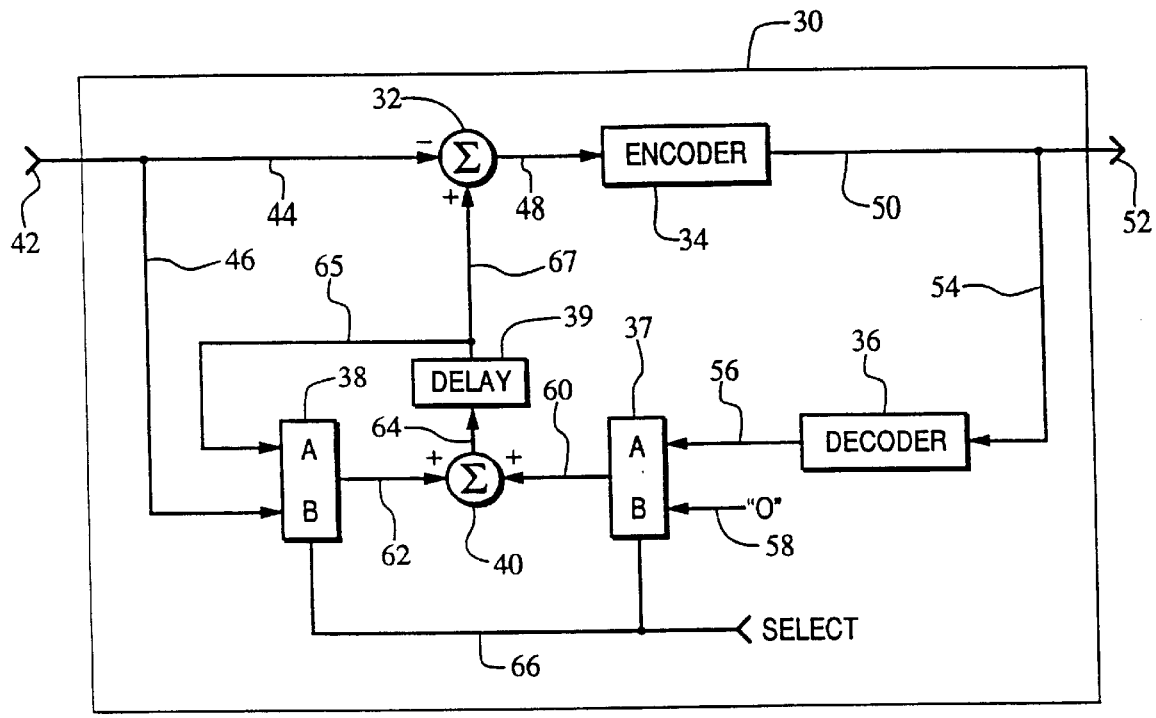
Fig.3
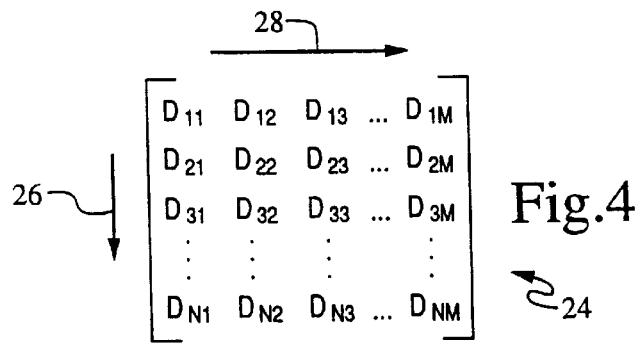
Fig.4
3 BIT TABLE
| CALCULATED DELTA | ENCODED VALUE | DECODED DELTA |
|---|---|---|
| -255 to -37 | 0 | -61 |
| -36 to -17 | 1 | -25 |
| -16 to -7 | 2 | -11 |
| -6 to -1 | 3 | -3 |
| 0 to 6 | 4 | 3 |
| 7 to 16 | 5 | 11 |
| 17 to 36 | 6 | 25 |
| 37 to 255 | 7 | 61 |
Fig.5A

3 BIT TABLE

| CALCULATED DELTA | ENCODED VALUE | DECODED DELTA |
|---|---|---|
| -255 to -31 | 0 | -61 |
| -30 to -7 | 1 | -13 |
| -6 to -3 | 2 | -4 |
| -2 to -1 | 3 | -1 |
| 0 to 2 | 4 | 1 |
| 3 to 6 | 5 | 4 |
| 7 to 30 | 6 | 13 |
| 31 to 255 | 7 | 61 |

4 BIT TABLE

| CALCULATED DELTA | ENCODED VALUE | DECODED DELTA |
|---|---|---|
| -255 to -131 | 0 | -193 |
| -130 to -65 | 1 | -97 |
| -64 to -34 | 2 | -49 |
| -33 to -17 | 3 | -25 |
| -16 to -10 | 4 | -13 |
| -9 to -5 | 5 | -7 |
| -4 to -2 | 6 | -3 |
| -1 to -1 | 7 | -1 |
| 0 to 1 | 8 | 1 |
| 2 to 4 | 9 | 3 |
| 5 to 9 | A | 7 |
| 10 to 16 | B | 13 |
| 17 to 33 | C | 25 |
| 34 to 64 | D | 49 |
| 65 to 130 | E | 97 |
| 131 to 255 | F | 193 |

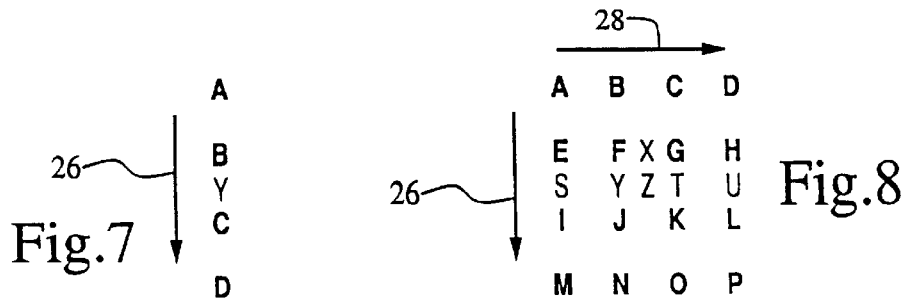
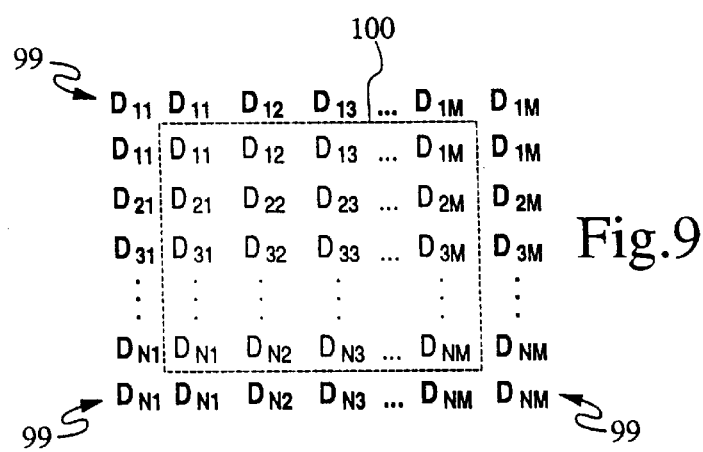
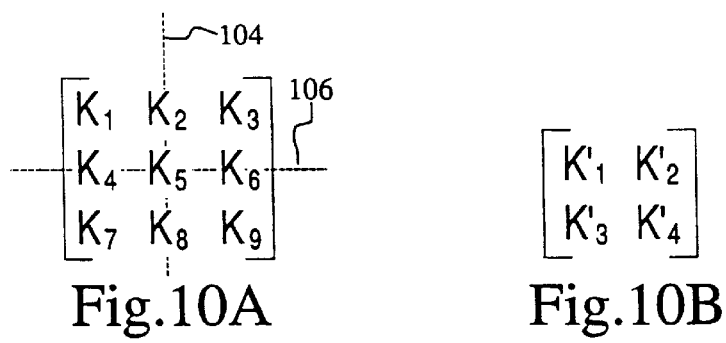
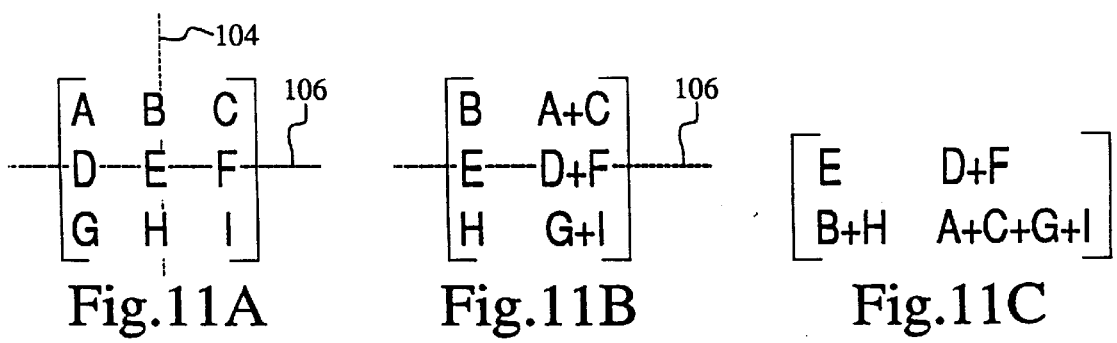

METHOD AND APPARATUS FOR COMPRESSING AND EXPANDING DIGITAL DATA

CROSS REFERENCE TO RELATED APPLICATIONS

This application is a continuation of U.S. application Ser. No. 08/204,965, filed Mar. 2, 1994, by Dane J. Broussard and Richard R. Matthews, and entitled "METHOD AND APPARATUS FOR COMPRESSING AND EXPANDING DIGITAL DATA."

TECHNICAL FIELD

The present invention relates to the compression and expansion of data and, in particular, to a method and apparatus for compressing and expanding digital data.

BACKGROUND OF THE INVENTION

Advancements in the development of improved signal processing algorithms have resulted in the production of output data with a high output dynamic range (in bits). For example, recently developed adaptive spectral equalization (ASE) and enhanced narrowband processing (ENP) algorithms having increased signal processing data output from a traditional three bits to eight bits. In view of the increased dynamic range of such signal processing algorithms, considerable effort is now being mounted in the development of efficient and effective methods and systems for compressing and expanding data. The key requirements of such compression and expansion systems are: minimal computational horsepower needs; fixed compressed data size for transferring a requisite amount of information; and minimal information loss or generated artifacts resulting from the data compression process. The requirement to minimize the requisite computational horsepower facilitates the use of commercial off-the-shelf computing components, thus reducing system implementation expense by obviating the need for custom hardware to support operational performance requirements. The remaining requirements reflect a balancing of the need to accurately transmit a large amount of information with the need to transmit that information in a minimal amount of space and time.

SUMMARY OF THE INVENTION

The present invention is a method and apparatus for compressing and expanding digital data. The apparatus includes a compressor module for compressing original data and an expander module for expanding the compressed data to substantially recover the original data.

The compressor module includes a reduced resolution data set (RRDS) generator providing a low pass filtering and decimation (down sampling) of the original data. The RRDS generator performs the down sampling in either the time dimension only (resulting in a one-half reduction in data size), or in both the time and frequency dimensions (resulting in a one-quarter reduction in data size). The RRDS generator provides a bypass functionality that, when selected, bypasses the low pass filtering and decimation operation and passes the original data to the output of the generator unaltered. The compressor module further includes a one-dimensional delta pulse code modulation (DPCM) compressor performing either three or four bit encoding on the data output from the RRDS generator. The DPCM compressor includes a compression feedback loop for minimizing the likelihood of compressor deviation.

The expander module includes a DPCM expander performing either three or four bit decoding of the data output from the compressor module. The expander module further includes an RRDS expander providing interpolation (upsampling) of the expanded data output from the DPCM expander. If bypass of the RRDS generator was previously selected during compression, the expanded data automatically bypasses the RRDS expander and is output unaltered. An edge enhancement filter is also included in the expander module for processing the data output from the RRDS expander to increase signal detectability by correcting for any signal and texture errors introduced by the RRDS generation and RRDS expansion processes.

BRIEF DESCRIPTION OF THE DRAWINGS

A more complete understanding of the present invention may be had by reference to the following Detailed Description when taken in conjunction with the accompanying Drawings wherein:

FIG. 3 is a schematic block diagram of the one-dimensional DPCM compressor utilized in the data compression and expansion system of the present invention;

FIG. 4 illustrates a format for a block of data processed by the DPCM compressor;

FIGS. 5A, 5B and 5C illustrate the encoding/decoding tables for three-bit, modified three-bit and four-bit DPCM encoding/decoding, respectively;

FIG. 6 is a schematic block diagram of the one-dimensional DPCM expander utilized in the data compression and expansion system of the present invention;

FIG. 7 illustrates the binary interpolation function executed for expansion of decimated data in the time dimension only;

FIG. 8 illustrates the binary interpolation function executed for expansion of decimated data in both the time and frequency dimensions;

FIG. 9 illustrates the replication of data points in non-existing rows and columns that are needed for data interpolation and filtering;

FIG. 10A illustrates a bi-axially symmetric 3×3 filter kernel;

FIG. 10B illustrates a 2×2 filter kernel folded from the bi-axially symmetric 3×3 filter kernel of FIG. 10A;

FIG. 11A illustrates a 3×3 block of data to be filtered by the bi-axially symmetric 3×3 filter kernel of FIG. 10; and FIGS. 11B and 11C illustrate the folding of the 3×3 block of data of FIG. 11A into a 2×2 data block to be filtered by the 2×2 filter kernel of FIG. 10B.

DETAILED DESCRIPTION OF THE DRAWINGS

Figure 1:
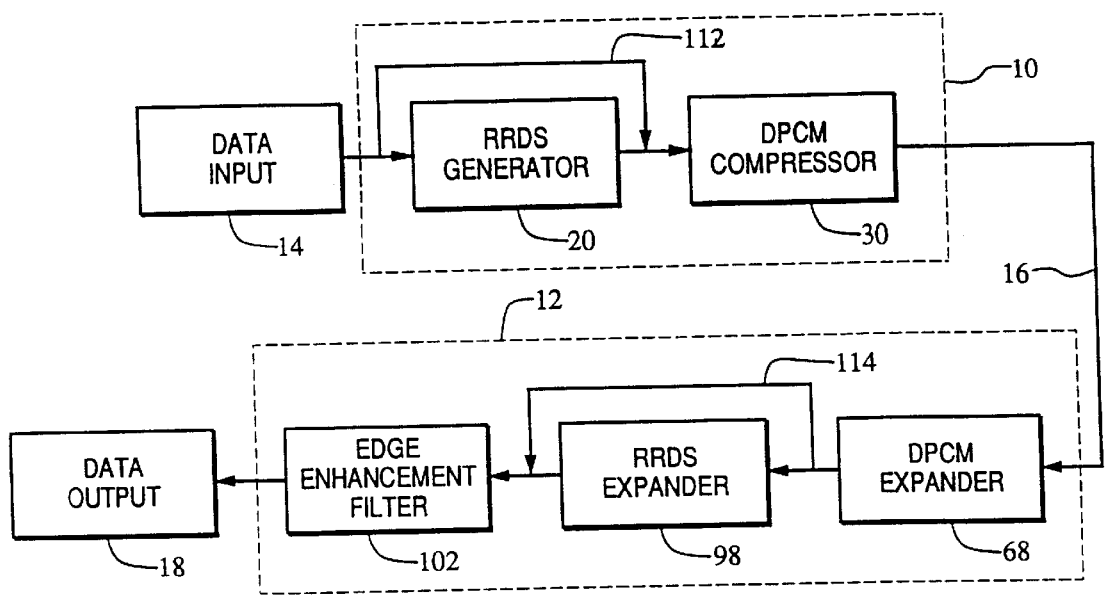
FIG. 1 is a schematic block diagram of the data compression and expansion system of the present invention.

Referring now to FIG. 1, there is shown a schematic block diagram of the data compression and expansion system of the present invention including a compressor module 10 and an expander module 12. The compressor module 10 receives original data (which may comprise imagery data, LOFAR-GRAM data, or other data in preferably an eight bit per data sample format) from input 14. The compressor module 10, after processing in a manner to be described, outputs compressed data for transmission along data communications link 16, or to a storage device (not shown) if desired. The expander module 12 receives compressed data from the data communications link 16 (or storage device, if present) and, after processing in a manner to be described, outputs, as generally indicated at 18, output data that is substantially identical to the original data received by the compressor module 10 from the input 14.

The compressor module 10 includes a reduced resolution data set (RRDS) generator 20 connected to the input 14 for receiving the original data. The RRDS generator 20 performs low pass filtering and decimation (down-sampling) operations on a block of original data for the purpose of reducing its size (perspective) to output a reduced resolution data block that includes a substantial portion of the statistical information present in the original data. As is well known, data such as LOFARGRAM data has both a time dimension 26 and a frequency dimension 28. The decimation performed by the RRDS generator 20 is performed in either the time dimension 26, resulting in a reduction of the original data by a factor of two, or in both the time and frequency dimensions 26 and 28, resulting in a reduction of the original data by a factor of four. The RRDS generator bypass 112, when selected, bypasses the RRDS low pass filtering and decimation operation and passes the input data to the output unaltered.

Figure 2A:
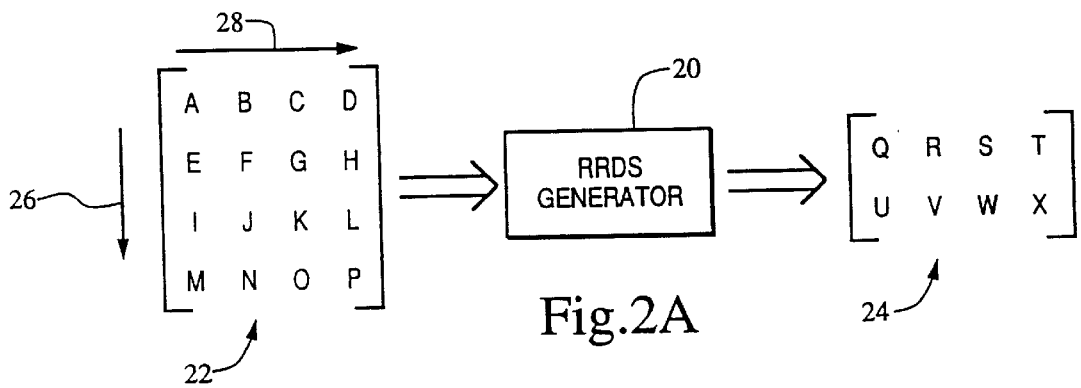
FIGS. 2A and 2B illustrate the reduction by one-half (time dimension) and by one-quarter (time and frequency dimensions), respectively, of original data by the RRDS generator utilized in the data compression and expansion system of the present invention.
Figure 2B:
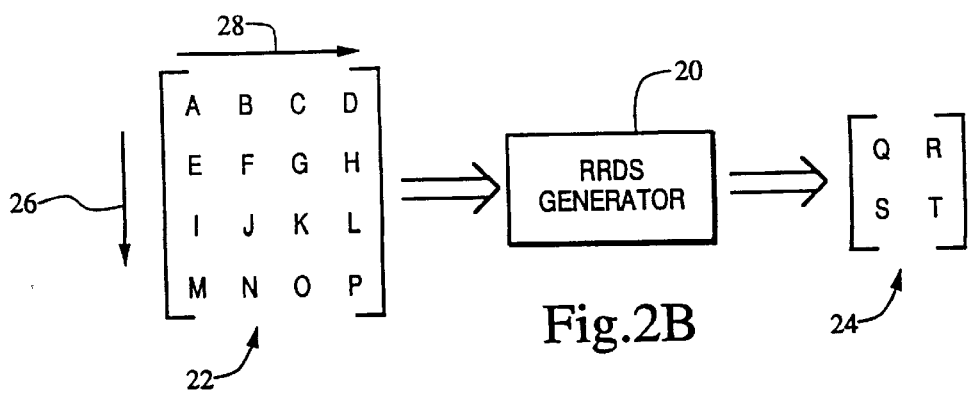

FIG. 2A illustrates the reduction of a 4×4 (time× frequency) block of original data 22 (each original data sample represented by a letter A through P) by a factor of two (one-half reduction) in the time dimension 26 only to generate a 2×4 block of reduced resolution data 24 (each reduced resolution data sample represented by a letter Q through X). Such a reduction is advantageously used in connection with the decimation of data, such as LOFAR-GRAM data, which exhibits a visual correlation in the time dimension 26. The one-half time dimension decimation function performed by the RRDS generator 20 on the original data block 22 to output the reduced resolution data block 24 is governed by the following equations:

$Q=(A+E)/2;$ $R=(B+F)/2;$ $S=(C+G)/2;$ $T=(D+H)/2;$ $U=(I+M)/2;$ $V=(J+N)/2;$ $W=(K+O)/2;$ and $X=(L+P)/2.$ FIG. 2B illustrates the reduction of a 4×4 (time× frequency) block of original data 22 (each original data sample represented by a letter A through P) by a factor of four (one-quarter reduction) by reducing by a factor of two in both the time and frequency dimensions 26 and 28, respectively, to generate a 2×2 block of reduced resolution data 24 (each data sample represented by a letter Q through T). The one-quarter decimation function performed by the RRDS generator 20 on the original data block 22 to output the reduced resolution data block 24 is governed by the following equations:

$Q=(A+B+E+F)/4;$ $R=(C+D+G+H)/4;$ $S=(I+J+M+N)/4;$ and $T=(K+L+O+P)/4.$

Because this one-quarter decimation merges data across the frequency dimension 28, some loss of information may be experienced with closely spaced (in frequency) signals with respect to a drop in signal detectability. However, as will be discussed in more detail herein with respect to the operation of the expander module 12, the use of an edge enhancement filter in accordance with the present invention to process RRDS expanded data samples substantially replaces any high frequency appearance (texture) in the data lost during decimation and subsequent expansion and increases signal detectability.

Referring again to FIG. 1, the compressor module 10 further includes a one-dimensional delta pulse code modulation (DPCM) compressor 30 connected to receive reduced resolution data 24 from the RRDS generator 20 and output compressed data for transmission over the data communications link 16. Delta pulse code modulation encoding takes advantage of local data statistics concerning the data to be encoded and typically estimates the value of the next data sample by examining one or more previous data samples. Instead of sending the next data sample with full value (for example, a full eight bits), a difference between the estimate for the next data sample and the actual value of the next data sample is calculated, encoded with compressed value (for example, three or four bits), and then transmitted.

The DPCM compressor 30 preferably included in the compressor module 10 utilizes a one-dimensional algorithm with an N-1 predictor. With N-1 prediction, the DPCM compressor 30 uses the data sample just prior to the data sample of interest as the predicted value. Thus, there is no prediction calculation required; the difference that is encoded with compressed value and transmitted is simply the difference between the data sample under examination and the prior adjacent data sample. In the alternative, the DPCM compressor 30 may utilize an adaptive DPCM algorithm to encode the reduced resolution data 24 received from the RRDS generator 20.

Decompression (expansion) of DPCM data will be discussed in more detail herein. However, a more complete understanding of the operation of the DPCM compressor 30 may be had with an understanding of the following information concerning decompression. In order for accurate decompression to occur, at least one full value data sample must be transmitted with the compressed data for the purpose of "seeding" the DPCM expander. In the present invention, it is preferred that all data samples in the first row of each data block of reduced resolution data 24 be transmitted through the DPCM compressor 30 to the expander module 12 with full value precision. The periodic retransmittal of a full value data sample row minimizes data loss during expansion in the event of a transmission error by re-syncing expansion. Alternatively, only the reduced resolution data sample in the upper left corner of each data block 24 may be transmitted at full value to seed DPCM expansion and increase data compression efficiency, provided the row of full value data samples are DPCM encoded as well.

Reference is now made to FIG. 3, wherein there is shown a schematic block diagram of the one-dimensional DPCM compressor 30 with an N-1 predictor utilized in the data compression and expansion system of the present invention. The DPCM compressor 30 includes a subtractor 32, an encoder 34, a decoder 36, two controllable switches 37 and 38, a unit delay 39 and a summer 40. The unit delay 39 provides a single sample time delay to synchronize the reconstructed predictor value with the incoming data stream to insure correct calculation. Reduced resolution data 24 (see, FIGS. 2A and 2B) is received at input 42, and is passed to both subtractor 32 via line 44 and port "B" of switch 38 via line 46. Output line 48 from subtractor 32 leads to encoder 34, with the encoder output line 50 connected to output 52, and connected to decoder 36 via feedback line 54. Such feedback from the encoder 34 minimizes the likelihood of compressor 30 deviation. Decoder output line 56 leads to port "A" of switch 37, with port "B" of switch 37 connected at 58 to a digital zero. The output lines 60 and 62 from switches 37 and 38, respectively, are connected to the summer 40, with the summer output line 64 connected to the unit delay 39. The output line 67 from the unit delay 39 is connected to the subtractor 32 and to port "A" of switch 38 via line 65.

Selection between the data input at ports "A" and "B" of switches 37 and 38 for output on lines 60 and 62, respectively, to summer 40 is controlled by a full value signal transmitted on select line 66. When transmission of the received reduced resolution data 22 at full value is required for subsequent "seeding", the full value signal on select line 66 is set high, and the data on the input lines for port "B" will be output from switches 37 and 38. In all other instances (full value signal set low), the data on the input lines for port "A" will be output from switches 37 and 38. Although not specifically shown in FIG. 3, it will be understood that when the full value signal on select line 66 is high, the reduced resolution data sample received at input 42 from the RRDS generator 20 will be passed at full value through the DPCM compressor 30 to the output 52 for connection to, and transmission over communications link 16 for the purpose of "seeding" the subsequent data expansion.

Operation of the DPCM compressor 30 may be more completely understood by reference to the following example illustrating the processing of a portion of a block 24 of reduced resolution data shown in FIG. 4 output from the RRDS generator 20. In accordance with the preferred processing method, the first row of data samples along the frequency dimension 28 comprise "seeding" data for full value transmission over communications link 16. The data samples in block 24 are transmitted in serial format down the columns along the time dimension 26 into the compressor 30 as follows:

$$D_{11}, D_{21}, D_{31} \ldots D_{N1}, D_{12}, D_{22} \ldots D_{N2}, D_{13} \ldots D_{1M} \ldots D_{NM}.$$

It will, of course, be understood that compression may just as easily be accomplished by parallel processing through the implementation of a parallel compressor architecture with multiple encoding paths operating on columns in tandem if desired.

First, with respect to the preferred serial processing method, data sample $D_{11}$ is received at input 42, and as the sample comprises a "seeding" sample, the full value signal on select line 66 is high. Thus, sample $D_{11}$ is passed directly to the output 52 for transmission over communications link 16, and is also passed along line 46 and by switch 38 from port "B" to summer 40 for addition to the digital zero value output from port "B" of switch 37. Thus, sample $D_{11}$ will be output on line 64 for input to the unit delay 39.

The next sample, $D_{21}$ is received at input 42 and subtracted by subtractor 32 from sample $D_{11}$ which was delayed one sample period by unit delay 39 and is now present on line 67. The delta value resulting from the subtraction operation is output to encoder 34 where a three or four bit code $C_{21}$ is determined and output via line 50 and output 52 for transmission over communications link 16. The three or four bit code is determined through use of a look-up-table implemented in the encoder 34 in accordance with one of the encoding/decoding tables shown in FIGS. 5A, 5B and 5C. If adaptive DPCM encoding is utilized, each data block 24 is analyzed to determine the optimum encoding/decoding table for the included data, with an identification of the selected table being transmitted with the compressed data over communications link 16 to be used during subsequent DPCM expansion.

Figures 5B, 5C, 6:
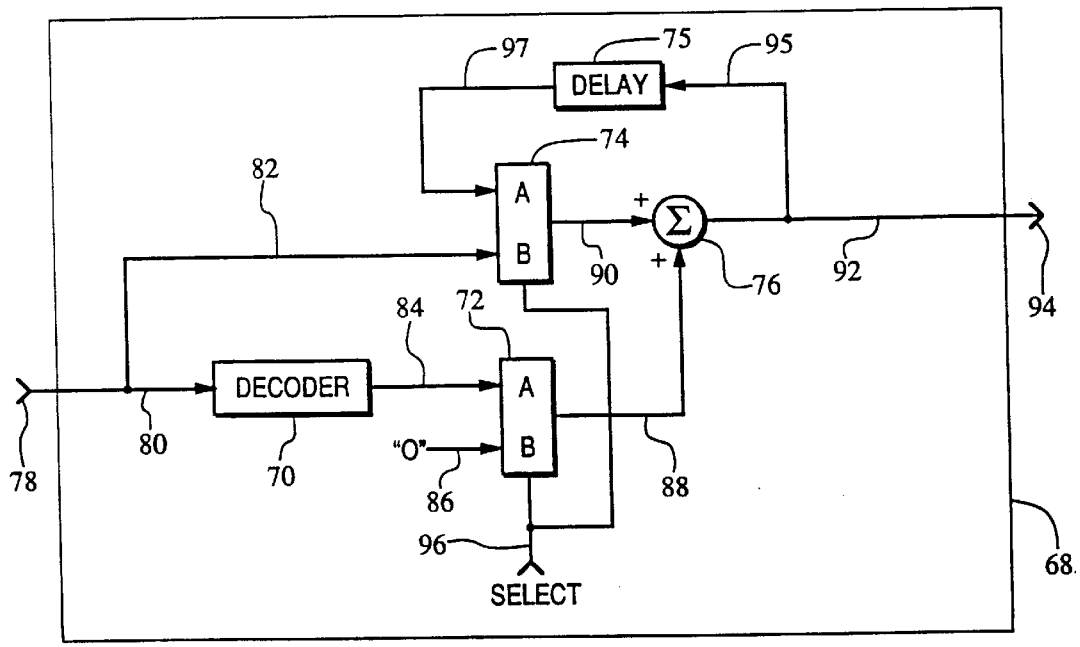

Further, the output code $C_{21}$ is also transmitted over feedback line 54 to decoder 36 where a decoded delta value is determined through use of a look-up-table implemented in the decoder in accordance with the appropriate encoding/decoding table as shown in FIGS. 5A, 5B and 5C, or in accordance with an identified table when adaptive DPCM encoding/decoding is used.

As the next sample $D_{21}$ does not comprise a "seeding" sample, the full value signal on select line 66 is low, and decoded delta value at port "A" of switch 37 and sample $D_{11}$, delayed one sample period by the unit delay 39, received at port "A" of switch 38, are output. The output values are summed by summer 40 for output as a decoded sample $D'_{21}$ on line 64 for input to the unit delay 39. Sample $D'_{21}$ may have a value outside a valid data range. In such instances, a data value for the sample above 255 will be clipped to 255, and a value below 0 will be clamped to 0 before input to the unit delay 39.

Next, the sample $D_{31}$ is received at input 42 and subtracted by subtractor 32 from the decoded sample $D'_{21}$, delayed one sample period by the unit delay 39 and now present on line 67, to generate another delta value resulting in the output by the encoder 34 on line 50 of the next three or four bit code $C_{31}$. The foregoing steps are then repeated for each data sample along each column in block 24 until the sample $D_{NM}$ has been received at input 42 and processed to output a three or four bit code $C_{NM}$ at 52 for transmission over communications link 16. The serial encoded output from the compressor 30 over communications link 16 for the serially input reduced resolution data block 24 in FIG. 4 thus would have the following format:

$$D_{11}, C_{21}, C_{31} \ldots C_{N1}, D_{12}, C_{22} \ldots C_{N2}, D_{13} \ldots D_{1M} \ldots C_{NM}.$$

The rate of compression for the DPCM compressor 30 implemented by the present invention is governed by whether three or four bit encoding (see, tables in FIGS. 5A, 5B and 5C) is selected by the user, and by the rate with which full value "seeding" data samples are transmitted over communications link 16. With the full value transmission of "seeding" data samples, a compression ratio for the DPCM compressor 30 of slightly higher than 8:3 for three bit encoding (see, tables in FIGS. 5A and 5B), and slightly higher than 8:4 for the four bit encoding (see, table in FIG. 5C) results. In particular, for a 1024×1024 (1 Megabyte) reduced resolution data block 24 of eight bit data samples with a "seeding" full value data transmission once every 1024 rows, the three bit compression ratio is 8:3.0049, and the four bit compression ratio is 8:4.0039. The rate of compression for the entire compressor, including the RRDS function, is governed by whether RRDS bypass is selected, one-half or one-quarter RRDS generation is selected, and three or four bit DPCM encoding is selected. Given the best compression rate, 3 bit encoding and one-quarter RRDS generation, the compression ratio for a 1024×1024 block of eight bit data samples would be 8:0.7524. Using the same 1024×1024 block, compression ratios of 8:1.0020, 8:1.5049 and 8:2.0039 are achievable with different selected combinations of RRDS generation and DPCM encoding.

Referring again to FIG. 1, the expander module 12 includes a one-dimensional delta pulse code modulation (DPCM) expander 68 connected to the data communications link 16 for receiving coded data transmissions output from the compressor module 10. FIG. 6 shows a schematic block diagram of the one-dimensional DPCM expander 68 utilized in the data compression and expansion system of the present invention. The DPCM expander 68 includes a decoder 70, two controllable switches 72 and 74, a unit delay 75, and a summer 76. Coded data is received from communications link 16 at input 78, which is connected to decoder 70 via line 80 and to port "B" of switch 74 via line 82. Output line 84 from decoder 70 leads to port "A" of switch 72, with port "B" connected at 86 to a digital zero value. The output lines 88 and 90 from switches 72 and 74, respectively, are connected to the summer 76, with the summer output line 92 connected to the output 94 of the DPCM expander 68, and to the input of the unit delay 75 via line 95. The output of the unit delay 75 is connected to port "A" of switch 74 via line 97.

Selection between the data inputs at ports "A" and "B" of switches 72 and 74 for output on lines 88 and 90, respectively, is controlled by a full value signal transmitted on select line 96. When a full value "seeding" coded data sample is received at input 78, the full value signal on select line 96 is high, and the data input to port "B" will be output from switches 72 and 74. In all other instances (full value signal low), the data input to port "A" will be output from switches 72 and 74.

Operation of the DPCM expander 68 may be more completely understood by reference to the following example illustrating the processing of a portion of the coded data output from DPCM compressor 30 and transmitted over communications link 16. As discussed above, the coded data stream comprises both full value "seeding" data samples (D) and coded samples (C), and has the following serial format:

$$D_{11}, C_{21}, C_{31} \ldots C_{N1}, D_{12}, C_{22} \ldots C_{N2}, D_{13} \ldots D_{1M} \ldots C_{NM}.$$

It will, of course, be understood that expansion may just as easily be accomplished by parallel processing through the implementation of a parallel expansion architecture with multiple decoding paths operating on columns in tandem if desired.

First, with respect to the preferred serial processing method, data sample $D_{11}$ is received at input 78. The expander 68 detects the full value of the sample, and identifies the sample as a "seeding" sample. Accordingly, the full value signal on select line 96 is set high. Sample $D_{11}$ is thus transmitted via line 82 to port "B" of switch 74 and output to summer 76 for addition to the digital zero value output from port "B" of switch 72. Accordingly, full value data sample $D_{11}$ is directly sent to line 92 to output 94 as a reduced resolution data sample $D_{11}$, and is further applied to the input of the unit delay 75 via line 95.

Next, coded sample $C_{21}$ is received at input 78, transmitted via line 80, and expanded by decoder 70 to output a decoded delta value applied to port "A" of switch 72 via line 84. The decoded delta value is determined from the coded sample through the use of a look-up-table implemented in the decoder 70 in accordance with one of the encoding/decoding tables shown in FIGS. 5A, 5B and 5C. If the data was compressed by the DPCM compressor 30 using an adaptive DPCM algorithm in the manner discussed above, the decoded delta value is determined by first receiving the identification of the proper encoding/decoding table, and then decoding the data sample in accordance with the identified table.

As the coded sample $C_{21}$ does not comprise a "seeding" sample, the full value signal on line 96 is low, and the decoded delta value at port "A" of switch 72 and sample $D_{11}$, delayed one sample period by the unit delay 75 and output to port "A" of switch 74 via line 97, are output to the summer 76. The output values are summed by summer 76 for output as a reduced resolution sample $D'_{21}$ on line 92 for output at 94, and application to the unit delay 75 via line 97. The foregoing steps are then repeated for each received coded sample until the coded sample $C_{NM}$ has been received at input 78 and processed to output 94 a reduced resolution $D'_{NM}$ sample. The reduced resolution data samples are output at 94 from the DPCM expander 68 in serial format as follows:

$$D_{11}, D'_{21}, D'_{31} \ldots D'_{N1}, D_{12}, D'_{22} \ldots D'_{N2}, D_{13} \ldots D_{1M} \ldots D'_{NM}.$$

Due to some inherent quantization errors, some generated reduced resolution data samples D' may have values outside a valid data range. In such instances, data values above 255 are clipped to 255, and data values below 0 are clamped to 0.

Referring again to FIG. 1, the expander module 12 further includes an RRDS expander 98 connected to the DPCM expander 68 to receive the reduced resolution data samples and reverse (up-sample) the RRDS generation function performed by the RRDS generator 20 in compressor module 10. The RRDS expander 98 utilizes a streamlined four point, two-dimensional, separable Lagrange polynomial interpolator to process the reduced resolution data samples received from the DPCM expander 68 and output substantially the original data. In the event RRDS generator bypass 112 was selected to bypass the low pass filtering and decimation functions, the RRDS expander bypass 114 will be automatically implemented to pass the output from the DPCM expander 68 to the output of the RRDS expander 98.

The interpolator implements the interpolation algorithm in essentially two-stages. In the first stage, four rows of four data samples each are used to generate four samples at (x0, y), (x1, y), (x2, y) and (x3, y) by applying four, one-dimensional four point Lagrange interpolators. In the second stage, the four generated data samples are used to generate a single sample (x, y) by applying a single one-dimensional four point Lagrange interpolator. This two stage scheme is further simplified in connection with its application in the context of the present invention by assuming equally spaced data samples having a separation of one.

The following equation illustrates the general form of the Lagrange polynomial equation in one dimension (x):

$$p(x) = \sum_{i=0}^{n-1} f_i e_i(x)$$

By letting x minus x1=Rx and y minus y1=Ry, solving of the Lagrange polynomials for the simple one-dimensional case results in the following:

$$e_0(R) = (-\tfrac{1}{6})(R^3 - 3R^2R + 2R)$$

$$e_1(R) = (\tfrac{1}{2})(R^3 - 2R^2 + 2);$$

$$e_2(R) = (-\tfrac{1}{2})(R^3 - R^2 - 2R);$$

and $$e_3(R) = (\tfrac{1}{6})(R^3 - R);$$

wherein R represents either $R_x$ or $R_y$ and is of the range extending from greater than or equal to zero to less than one.

By letting $D_0$, $D_1$, $D_2$ and $D_3$ represent the four one-dimensional points, and combining with the above equations, the following simplified one-dimensional interpolation polynomial is produced:

$$p(R)=(\tfrac{1}{3})(S_0R^3+S_1R^2+S_2R+S_3),$$

wherein:

$S_0 = -0.5*D_0+1.5*D_1-1.5*D_2+0.5*D_3;$
$S_1 = 1.5*D_0-3.0*D_1+1.5*D_2;$
$S_2 = -1.0*D_0-1.5*D_1+3.0*D_2-0.5*D_3;$ and
$S_3 = 3.0*D_1.$ After calculation of p(R) in accordance with the foregoing interpolation polynomial, the generated sample p(R) may have a value outside a valid data range. In such instances, a data value above 255 is clipped to 255, and a data value below 0 is clamped to 0.

Use of the foregoing algorithm in the RRDS expander 98 for expanding the received reduced resolution data samples to reverse the RRDS generation function performed by the RRDS generator 20 on the original data provides a substantially high quality output. Furthermore, because of the product separable nature of the algorithm and its ability for simplification at binary magnifications, processing of the algorithm requires relatively low computational horsepower.

As discussed above with respect to the operation of the RRDS generator 20, the decimation function is performed on the original data 22 either only in the time dimension, resulting in a reduction of the original data by a factor of two, or in both the time and frequency dimensions, resulting in a reduction of the original data by a factor of four. When the reduced resolution data samples are received by the RRDS expander 98, the proper expansion, either two times expansion for the data decimated in only the time dimension, or four times expansion for the data decimated in both the time and frequency dimensions, is automatically performed by the expander.

FIG. 7 illustrates the execution of the binary interpolation function for expansion of the reduced resolution data samples received from the DPCM expander 68 in the time dimension 26 only, wherein data samples A through D represent received reduced resolution data samples, and Y represents the data sample to be interpolated. For the two times expansion in the time dimension 26, interpolation is needed for only a single data point Y wherein $R_x=0$ and $R_y=0.5$. Substituting $R_x$ and $R_y$ into the foregoing Lagrange interpolator equation simplifies the calculation to the following single, one-dimensional, four point interpolation in the time dimension 26 providing a two times expansion:

$$Y=p(0.5)=(\tfrac{1}{3})(0.125*S_0+0.25*S_1+0.5*S_2+S_3)=(\tfrac{1}{3})(-0.1875*A+1.6875*B+1.6875*C-0.1875*D).$$

FIG. 8 illustrates the binary interpolation function executed for expansion of the reduced resolution data samples received from the DPCM expander 68 in both the time and frequency dimensions, wherein data samples A through P represent received reduced resolution data samples, data samples X through Z represent the data points to be interpolated, and data samples S through U represent intermediate points that must be calculated. For the two times expansion performed in both the time and frequency dimensions 26 and 28, respectively, interpolation is needed for three data points X, Y and Z wherein: $R_x=0$ and $R_y=0.5$; $R_x=0.5$ and $R_y=0$; and, $R_x=0.5$ and $R_y=0.5$, respectively. Substituting the foregoing $R_x$ and $R_y$ values into the foregoing Lagrange interpolator equation results in the calculation of the following six one-dimensional four point interpolations providing a four times expansion (two times in the time dimension and two times in the frequency dimension):

$$X=(\tfrac{1}{3})(-0.1875*E+1.6875*F+1.6875*G-0.1875*H);$$

$$S=(\tfrac{1}{3})(-0.1875*A+1.6875*E+1.6875*I-0.1875*M);$$

$$Y=(\tfrac{1}{3})(-0.1875*B+1.6875*F+1.6875*J-0.1875*N);$$

$$T=(\tfrac{1}{3})(-0.1875*C+1.6875*G+1.6875*K-0.1875*O);$$

$$U=(\tfrac{1}{3})(-0.1875*D+1.6875*H+1.6875*L-0.1875*P);$$

and $$Z=(\tfrac{1}{3})(-0.1875*S+1.6875*Y+1.6875*T-0.1875*U).$$

Execution of the foregoing two times and four times interpolation functions requires the presence of surrounding data. When processing received reduced resolution data samples in the first and last rows and first and last columns of a data block, special processing techniques are employed because such surrounding data does not exist. Data points in non-existing rows and columns are replicated, in the manner generally illustrated at reference numeral 99 in FIG. 9 and bold-faced emphasized from the existing data (shown within dotted line area 100) prior to interpolation, and discarded following completion of the expansion process. Because the data in the affected rows and columns typically comprises little information, the adverse affects on accuracy caused by the data replication process are considered acceptable. The resulting output from the RRDS expander 98 comprises an output data block that is substantially identical to the original data block received at the input 14 of the compressor module 10.

Referring again to FIG. 1, the expander module 12 further includes an edge enhancement filter 102 connected to the RRDS expander 98 to receive the output data block and filter the data for output at 18. A side effect of the RRDS generation and RRDS expansion processes performed in the compressor module 10 and expander module 12, respectively, is that these processes perform a low pass filtering operation which is perceived as a slight "blurring" of the processed data. To compensate for the blurring effect and enhance narrowband signatures, the edge enhancement filter 102 replaces the high frequency appearance (texture) of the data lost during decimation and Lagrange interpolation.

The edge enhancement filter 102 employs a bi-axially symmetric 3×3 filter kernel as shown in FIG. 10A having filter coefficients $K_1$ through $K_9$ for filtering (enhancing) data point E in the 3×3 block of output data (A through I) shown in FIG. 11A received from the RRDS expander 98. The filtering calculation for data point E' inefficiently requires nine computationally intensive multiplications followed by eight additions as set forth below:

$$E'=K_1*A+K_2*B+K_3*C+K_4*D+K_5*E+K_6*F+K_7*G+K_8*H+K_9*I.$$

However, because the filtering coefficients are bi-axially symmetric, the number of multiplication operations required may be reduced due to the associative property of mathematics by "folding" both the 3×3 filter kernel of FIG. 10A and the 3×3 block of recovered original data shown in FIG. 11A along the two axes shown in the FIGURES at reference numerals 104 and 106.

With respect to the 3×3 block of recovered original data shown in FIG. 11A, the first fold, illustrated in FIG. 11B, is made along the axis 104 defined by data points B, E and H. The second fold, illustrated in FIG. 11C resulting in a 2×2 block ready for processing, is made along the axis 106 defined by data points E and D+F in the block shown in FIG. 11B. The 3×3 filter kernel of FIG. 10A is similarly processed with respect to axes 104 and 106 to result in a 2×2 filter kernel shown in FIG. 10B.

Filtering of the 2×2 data block (FIG. 11C) by the 2×2 filter kernel (FIG. 10B) results in a filtered data point (E') equation of the form:

$$E'=K'_1*E+K'_2(D+F)+K'_3(B+H)+K'_4(A+C+G+I)$$

wherein:

$K'_1=K_5$;
$K'_2=K_4=K_6$;
$K'_3=K_2=K_8$; and
$K'_4=K_1=K_3=K_7=K_9$.

This equation produces an identical result to the prior computationally intensive calculation set forth above, but advantageously reduces the requisite math to only four multiplications and eight additions. After calculation of E' in accordance with the foregoing filtering operation, it is possible that the generated filtered data sample E' may have a value outside a valid data range. In such instances, a data value for the sample above 255 will be clipped to 255, and a data value below 0 will be clamped to 0.

It will, of course, be understood that the filter coefficients may have any values selected to obtain certain desired functionality (for example, low pass roll-off or high gain edge boost), provided the coefficients meet the following unity gain criteria:

$$1=K_1+K_2+K_3+K_4+K_5+K_6+K_7+K_8+K_9.$$

In the preferred embodiment, the filter coefficients (satisfying the unity gain criteria) have the following values:

$K'_1=2.6$;
$K'_2=-0.4$;
$K'_3=-0.4$; and
$K'_4=0.0$.

As with the processing of the received reduced resolution data by the RRDS expander 98, the presence of data surrounding the data samples in the first and last rows and first and last columns of a data block is required by the edge enhancement filter 102. However, such surrounding data does not exist. Accordingly, in the manner discussed above with respect to FIG. 9, data points in non-existing surrounding rows and columns are replicated from the existing data and discarded following completion of the expansion process. The adverse affects on accuracy caused by this data replication process are considered acceptable because the data in the affected rows and columns typically comprises little information.

Although several embodiments of the system of the present invention have been illustrated in the accompanying Drawings and described in the foregoing Detailed Description, it will be understood that the invention is not limited to the embodiments disclosed, but may be modified without departing from the scope of the invention as set forth and defined by the following claims.

What is claimed is:

1. Apparatus for compressing original data, comprising:
   a reduced resolution data set generator for decimating a received block of original data in accordance with a bypass function or a selected one of two reduction factors to output reduced resolution data, said data set generator reducing the size of the block of original data by combining two or more original data samples in the block of the original data into a reduced resolution data sample to produce a block of reduced resolution data; and
   a delta pulse code modulation compressor receiving the block of reduced resolution data for processing the received block of reduced resolution data to generate delta values and for encoding the delta values in accordance with a selected one of two compression factors to output compressed data having a compression ratio varying with the selected reduction factor and the selected compression factor.

2. The apparatus as in claim 1 wherein the delta pulse code modulation compressor further includes a selection circuit for periodically outputting received reduced resolution data with the output compressed data, said output reduced resolution data seeding subsequent data expansion.

3. A data compression and expansion system, comprising:
   a reduced resolution data set generator for decimating a block of received original data to output reduced resolution data, said data set generator reducing the size of the block of original data in accordance with a bypass function or one of two reduction factors and in accordance with one of two compression factors that combines two or more original data samples in the block of the received original data into a reduced resolution data sample to produce a block of reduced resolution data having a compression ratio varying with the selected reduction factor and the selected compression factor;
   a reduced resolution data expander interpolating received reduced resolution data in accordance with a multi-point, one or two dimensional, separable Lagrange polynomial interpolator to output recovered original data; and
   an edge enhancement filter for processing the recovered original data to output filtered original data.

4. The data compression and expansion system as in claim 3 wherein the reduced resolution data expander processes the reduced resolution data as a row by column block of reduced resolution data samples, the reduced resolution data expander further replicating reduced resolution data samples in non-existing rows and columns from the received reduced resolution data samples.

5. The data compression and expansion system as in claim 3 wherein the edge enhancement filter processes the recovered original data in a row by column block of recovered original data samples to generate filtered recovered original data, said edge enhancement filter generating a corresponding filtered recovered original data sample from a recovered original data sample and adjacent recovered original data samples within said block.

6. The data compression and expansion system as in claim 5 wherein the edge enhancement filter replicates original data samples in non-existing rows and columns from the recovered original data samples for use in filtering recovered original data samples positioned in a first row, last row, first column or last column of the row by column block.

7. The data compression and expansion system as in claim 3 further including:
   a delta pulse code modulation compressor for processing the reduced resolution data to output delta values and for encoding delta values to output compressed data; and
   a delta pulse code modulation expander for decoding the compressed data to output a recovered delta value and for processing the recovered delta value to output recovered reduced resolution data.

8. The data compression and expansion system as in claim 7 wherein the delta pulse code modulation compressor further includes a selection circuit for periodically outputting received reduced resolution data with the output compressed data, said output reduced resolution data seeding subsequent data expansion.

9. A process for compressing and expanding data, comprising:

receiving a block of original data;

decimating the block of original received data to output reduced resolution data, said decimating comprising reducing the size of the block of original data in accordance with a bypass function or one of two reduction factors and in accordance with one of two compression factors that combines two or more original data samples in the block of the original data with a reduced resolution data sample to produce a block of reduced resolution data having a compression ratio varying with the selected reduction factor and the selected compression factor;

interpolating reduced resolution data to output recovered original data including recovering the original data in accordance with a multi-point, one or two dimensional, separable Lagrange polynomial interpolator; and edge enhancement filtering the recovered original data to output filtered original data.

10. The process for compressing and expanding data as in claim 9 wherein interpolating comprises interpolating a row by column block of reduced resolution data using a Lagrange interpolator.

11. The process for compressing and expanding data as in claim 10 wherein interpolating further comprises replicating, from the reduced resolution data, reduced resolution data in non-existing rows and columns.

12. The process for compressing and expanding data as in claim 9 wherein edge enhancement filtering comprises filtering a row by column block of recovered original data using a filter kernel.

13. The process for compressing and expanding data as in claim 12 wherein edge enhancement filtering further comprises replicating, from the recovered original data, recovered original data in non-existing rows and columns.

14. The process for compressing and expanding data as in claim 9, further comprising:

encoding the reduced resolution data to output compressed data; and decoding the compressed data to output recovered reduced resolution data for subsequent interpolating and filtering to output the filtered original data.

15. The process for compressing and expanding data as in claim 14 wherein encoding comprises delta pulse code modulation compressing the reduced resolution data, and decoding comprises delta pulse code modulation expanding the compressed data.

16. The process for compressing and expanding data as in claim 14 wherein delta pulse code modulation compressing further includes feeding compressed data back to the encoding to minimize the likelihood of deviation during compressing.

17. The process for compressing and expanding data as in claim 14 wherein encoding includes periodically transmitting unencoded reduced resolution data with compressed data for seeding the subsequent decoding of the compressed data.

18. Apparatus for compressing original data, comprising:

a reduced resolution data set generator for decimating received original data to output reduced resolution data, said reduced resolution data set generator reducing the size of the original data in accordance with a bypass function or one of two reduction factors by combining two or more original data points in a block of the original data to generate a single data value and produce a block of reduced resolution data; and a delta pulse code modulation compressor receiving the reduced resolution data, said delta pulse code modulation compressor comprising, means for processing the received reduced resolution data to generate delta values, means for encoding the delta values in accordance with one of two compression factors to output compressed data having a compression ratio varying with the selected reduction factor and the selected compression factor, and means for periodically seeding the compressed data with one or more selected data points of the reduced resolution data whereby the one or more selected data points bypass the means for processing and the means for encoding to be selectively output with the compressed data.

* * * * *

UNITED STATES PATENT AND TRADEMARK OFFICE
CERTIFICATE OF CORRECTION

PATENT NO.    : 6,249,611 B1
DATED         : June 19, 2001
INVENTOR(S)   : Dane John Broussard et al.

It is certified that error appears in the above-identified patent and that said Letters Patent is hereby corrected as shown below:

<u>Column 8,</u>
Line 15, after "at", bold the number "94".
Line 17, the portion of the formula reading $D'_{N2}, D_{13}$ should read -- $D'_{N2}, D_{13}$. --.
Line 59, the portion of the formula reading $(R^3 - 3R^2R + 2R)$ should read
-- $(R^3 - 3R^2 + 2R)$; --.

Signed and Sealed this

Nineteenth Day of March, 2002

Attest:

JAMES E. ROGAN
*Director of the United States Patent and Trademark Office*

*Attesting Officer*